United States Patent
Armacanqui et al.

(10) Patent No.: US 9,252,430 B2
(45) Date of Patent: Feb. 2, 2016

(54) ALKALINE CELL WITH IMPROVED HIGH RATE CAPABILITY

(71) Applicant: Spectrum Brands, Inc., Madison, WI (US)

(72) Inventors: M. Edgar Armacanqui, Madison, WI (US); Wen Li, Madison, WI (US); Andrew John Roszkowski, Waunakee, WI (US); John Lee Hadley, Madison, WI (US); Janna Lynn Rose, Oregon, WI (US)

(73) Assignee: SPECTRUM BRANDS, INC., Middleton, WI (US)

( * ) Notice: Subject to any disclaimer, the term of this patent is extended or adjusted under 35 U.S.C. 154(b) by 191 days.

(21) Appl. No.: 13/954,242

(22) Filed: Jul. 30, 2013

(65) Prior Publication Data
US 2015/0037627 A1    Feb. 5, 2015

(51) Int. Cl.
*H01M 4/36*    (2006.01)
*H01M 4/62*    (2006.01)
*H01M 4/24*    (2006.01)
*H01M 4/02*    (2006.01)
*H01M 4/06*    (2006.01)
*H01M 4/42*    (2006.01)
*H01M 12/04*    (2006.01)
*H01M 12/08*    (2006.01)

(52) U.S. Cl.
CPC ............. *H01M 4/628* (2013.01); *H01M 4/244* (2013.01); *H01M 4/06* (2013.01); *H01M 4/42* (2013.01); *H01M 12/04* (2013.01); *H01M 12/08* (2013.01); *H01M 2004/021* (2013.01); *H01M 2004/023* (2013.01); *H01M 2004/027* (2013.01)

(58) Field of Classification Search
CPC ................. H01M 2004/023; H01M 2004/027; H01M 4/364; H01M 4/42
See application file for complete search history.

(56) References Cited

U.S. PATENT DOCUMENTS

2010/0178538 A1*    7/2010    Durkot et al. .................... 429/50
2011/0151334 A1*    6/2011    Shimamura et al. ........... 429/300

* cited by examiner

*Primary Examiner* — Brittany Raymond
(74) *Attorney, Agent, or Firm* — Foley & Lardner LLP

(57) ABSTRACT

The present disclosure relates generally to an alkaline electrochemical cell, such as a battery, and in particular to an improved gelled anode suitable for use therein. More specifically, the present disclosure relates to a gelled anode that improves anode discharge efficiency by adjusting physical properties such as apparent density.

20 Claims, 9 Drawing Sheets

US 9,252,430 B2

ALKALINE CELL WITH IMPROVED HIGH RATE CAPABILITY

FIELD OF THE DISCLOSURE

The present disclosure relates generally to an alkaline electrochemical cell, such as a battery, and in particular to an improved gelled anode suitable for use therein. More specifically, the present disclosure relates to a gelled anode that improves anode discharge efficiency by adjusting physical properties such as apparent density.

BACKGROUND OF THE DISCLOSURE

Alkaline electrochemical cells, commonly known as "batteries," are used to power a wide variety of devices used in everyday life. For example, devices such as radios, toys, cameras, flashlights, and hearing aids all ordinarily rely on one or more electrochemical cells to operate. These cells produce electricity by electrochemically coupling, within the cell, a reactive gelled metallic anode, most commonly a zinc-containing gelled anode, to a cathode through a suitable electrolyte, such as a potassium hydroxide solution.

High rate discharge performance for cells in devices is partly dependent on the availability of sufficient anode reaction sites in the vicinity of the anode-cathode interface. This can be accomplished by increasing the level of fine particles in the anode; however, increasing the level of fines has a limit to improving performance because the discharge product around the fine particles disrupts particle-to-particle contact and also tends to suppress ion diffusion. Ion diffusion can be an essential step to sustain fast anode-cathode reactions demanded by high drain rates.

In view of the foregoing, the need exists for an anode that improves the discharge rate capability of alkaline cells.

SUMMARY OF THE DISCLOSURE

Briefly, therefore, the present disclosure is directed to an alkaline electrochemical cell comprising a cathode; a gelled anode mixture, the mixture comprising an anode active material, a gelling agent, and an alkaline electrolyte, wherein the anode active material has an apparent density of from about 2.50 g/cc to about 3.00 g/cc; and, a separator between the cathode and the anode.

The present disclosure is also directed to a gelled anode mixture comprising an anode active material, a gelling agent, and an alkaline electrolyte, wherein the anode active material has an apparent density of from about 2.50 g/cc to about 3.00 g/cc.

Other objects and features will be in part apparent and in part pointed out hereinafter.

DETAILED DESCRIPTION OF THE DISCLOSURE

The present disclosure is directed to improving the discharge rate capability of cells, such as alkaline cells. The disclosure is also aimed at improving the anode discharge efficiency of cells by adjusting physical properties of the cells, such as the apparent density of the anode active material. For example, this disclosure is generally directed to improving anode active material properties, such as apparent density, to enhance the anode discharge efficiency at high drains of discharge.

I. General Electrochemical Cell Structure

Figure 1:
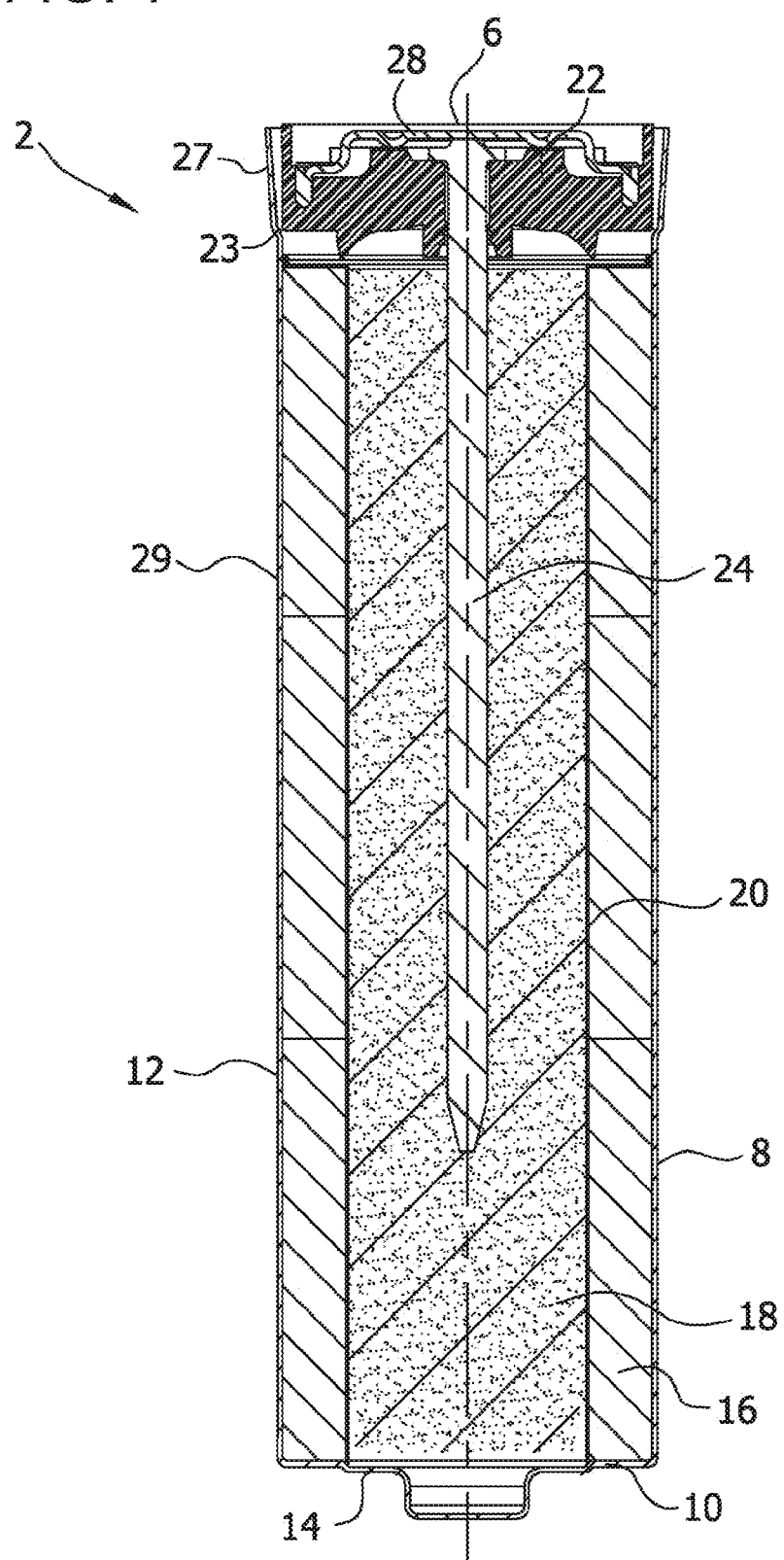
FIG. 1 shows a cross-section of an exemplary embodiment of an electrochemical cell in accordance with the present disclosure.

Referring now to FIG. 1, an electrochemical cell is shown in the form of a AA-size cylindrical cell battery and is generally indicated at 2. It is contemplated, however, that the electrochemical cell of the present disclosure has applications to other sized batteries (e.g., AA-, AAA-, C- and D-), as well as to non-cylindrical cells, such as flat cells (e.g., prismatic cells and button cells) and rounded flat cells (e.g., having a racetrack cross-section). The cylindrical cell configuration shown in FIG. 1 has a positive terminal 14, a negative terminal 6, and a positive current collector in the form of an electrically conductive cylindrical container 8. In the illustrated electrochemical cell, a single piece formed container 8 may be of drawn steel having a closed bottom formed by an end wall 10 and a cylindrical side wall 12 formed as one piece with the end wall 10. The positive terminal 14 is thus defined by the end wall 10 of the metal container 8 in the illustrated embodiment. However, in alternative embodiments, the end wall may be flat and have a positive terminal plate (not shown) attached thereto as by welding to define the positive terminal 14 without departing from the scope of this disclosure. The opposite end of the container 8 is generally open. As used herein the term "side wall" refers not only to a wall like the illustrated cylindrical wall 12 having a single, continuous curve, but also to side walls (not shown) having other shapes including those formed from multiple flat wall sections.

Contained in the container is a cathode 16 comprised of one or more annular rings formed of a suitable cathode material which defines an open center along the longitudinal direction of the container. The cathode 16 may suitably have an outer diameter that is slightly greater than the inner diameter of the container side wall 12, to provide a tight fit upon insertion of the cathode into the container 8. A suitable coating, such as carbon, may be applied to the inner surface of the container side wall 12 to enhance electrical contact between the cathode 16 and the container 8. The cathode may comprise any number of various components, including for example an oxide of copper, manganese dioxide (e.g., electrolytic manganese dioxide), or other suitable cathode materials.

Also contained in the container of FIG. 1 is a gelled anode 18, as further detailed elsewhere herein, which is located on the inner diameter of a separator 20 so that the separator physically separates the gelled anode 18 from the cathode 16. The gelled anode 18, as further detailed elsewhere herein, can be formed in any suitable manner, and may suitably comprise a mixture including an anode metal (e.g., zinc) provided as a powder, an aqueous alkaline electrolyte and a highly crosslinked, polyacrylic acid gelling agent. Examples of anode 18 formulations, which may be generally suitable for use in accordance with the present disclosure, are further detailed elsewhere herein. Additional electrolyte (not shown) may be added to the container 8 during cell fabrication to further, or partially, wet the anode 18, the cathode 16 and the separator 20. Suitable electrolytes include, for example, potassium hydroxide, sodium hydroxide, and/or lithium hydroxide, in an alkaline battery, but other compositions can be used without departing from the scope of the present disclosure.

To finally assemble the electrochemical cell, the cathode 16, separator 20 and anode 18 are loaded into the container 8 with the container in its open configuration as shown. A sealing assembly 22, negative current collector 24 and negative terminal plate 28 are placed in the open upper end of the container 8 with the sealing assembly 22 seating on the shoulder 23 formed at the junction of the upper and lower extents 27, 29 of the container and the negative terminal plate 28 seated on the shoulder formed in the sealing assembly 22.

It is to be noted that the term "longitudinal", as used herein, refers to the general direction extending from one end of the container 8 to the other, regardless of whether the greatest dimension of the container is in the longitudinal direction. The terms "lateral," "transverse" and "radial" refer to a general direction extending perpendicular to the longitudinal direction so as to extend through the side wall 12 of the container 8. In particular, where the term radial is used herein in reference to annular or circular shaped elements, it is understood that the terms lateral and transverse may be substituted for the radial components that are other than annular or circular.

It is to be further noted that the electrochemical cell of the present disclosure is typically illustrated in a generally vertical orientation, with the positive terminal at the bottom and the negative terminal at the top. Accordingly, use of terms herein such as top, bottom, upper and lower, are in reference to positions along the longitudinal direction of the cell 2 (e.g., of the container 8), while the use of terms such as inner and outer are in reference to positions along the transverse or radial direction.

II. Gelled Anode

As previously noted, the present disclosure is generally directed to a gelled anode, and/or an electrochemical cell comprising such a gelled anode, which comprises a gelling agent (as further detailed elsewhere herein), an alkaline electrolyte (e.g., an aqueous potassium hydroxide solution), and an anode active material (e.g., a material typically comprising zinc). The gelling agent is present in the anode, at least in part, to add mechanical structure and/or to coat the metallic particles to improve ionic conductivity within the anode during discharge. The preparation of the gelled anode is further detailed elsewhere herein; generally speaking, however, the gelled anode may be prepared by preparing an electrolyte, preparing a coated metal anode which includes the gelling agent, and then combining the electrolyte and the coated metal anode to form a gelled anode.

In this regard it is to be noted that, as used herein, "gelled anode" (as well as variations thereof) generally refers to the anode once the electrolyte (or in some instances the remaining portion of the electrolyte) has been added or introduced thereto. In contrast, a "coated metal anode" (as well as variations thereof) generally refers to the anode prior to addition or introduction of the electrolyte thereto (or the full amount of the electrolyte thereto).

A. Anode Active Material

1. Active Material

The type of the anode active material may generally be selected from those known in the art, in order to optimize performance of the alkaline electrochemical cell of which this gelled anode is a part. In some embodiments, the anode active material comprises zinc, which may be used alone or in combination with one or more other metals. Furthermore, it is typically used in the form of an alloy powder. Thus, in some embodiments the anode active material comprises a zinc alloy.

For example, in one or more embodiments one of ordinary skill in the art may readily select a suitable powder comprising zinc mixed with, or alloyed with, one or more other metals known in the art (e.g., In, Bi, Ca, Al, Pb, etc.). Accordingly, in this regard it is to be noted that, as used herein, "anode active material" and/or "zinc" may refer to a particle or powder alone, or one that has been optionally mixed or alloyed with one or more other metals. Anode active material particles may be present in a variety of forms including, for example, elongated, round, as well as fiber-like or flake-like particles.

In some embodiments, the anode active material is in powder form that is a disk atomized type powder produced by a spinning disk process. This method of processing can produce desired shapes and particle morphologies, including elongated and round anode active material particles. The level of elongated and/or round particles can be modulated as necessary with this method by adjusting the operating parameters to make the powder. Some level of spherical shaped particles can serve to provide good processing and the anode gel mixture will flow better in the presence of these particles. In other embodiments, air atomization is used to prepare the anode active material particles. Elongated particles, among other shapes, can also be produced when the air atomization process is used.

In some embodiments of the present disclosure, the zinc alloy comprises indium and bismuth. In some embodiments of the present disclosure, the zinc alloy comprises from about 80 ppm to about 250 ppm of bismuth, in some embodiments about 120 ppm of bismuth, and in other embodiments about 200 ppm of bismuth. In other embodiments of the present disclosure, the zinc alloy comprises from about 80 ppm to about 250 ppm of indium, in some embodiments about 120 ppm of indium, and in other embodiments about 200 ppm of indium. In yet other embodiments of the present disclosure, the zinc alloy comprises about 120 ppm of indium and about 120 ppm of bismuth. In still other embodiments of the present disclosure the zinc alloy comprises about 200 ppm of indium and about 200 ppm of bismuth. In other embodiments of the present disclosure, the zinc alloy comprises from about 80 ppm to about 250 ppm of bismuth and from about 80 ppm to about 250 ppm of indium.

In alternative embodiments of the present disclosure, the zinc alloy comprises lead. In some embodiments of the present disclosure, the zinc alloy comprises from about 350 ppm to about 600 ppm of lead, in some embodiments about 425 ppm of lead, and in other embodiments about 500 ppm of lead. In other embodiments, the zinc alloy comprises aluminum. In some embodiments of the present disclosure, the zinc alloy comprises from about 80 ppm to about 250 ppm of aluminum, in some embodiments about 100 ppm of aluminum, and in other embodiments about 200 ppm of aluminum. In still other embodiments of the present disclosure, the zinc alloy comprises bismuth and lead. In other embodiments, the zinc alloy comprises bismuth, indium and aluminum.

It is to be noted, however, that the type and/or concentration of the anode active material, and/or the electrolyte, may be affected by the selections made with respect to the other components of the electrochemical cell, such as for example the cathode. For example, conventional cathodes, such as those having $MnO_2$ as an active ingredient, may consume more water by the cathodic reaction than is provided by the electrolyte. The anodes of conventional alkaline cells are thus generally limited to an active material concentration, or loading, that is below about 70 wt %, based on the weight of the anode, because higher loadings may not discharge efficiently, as the anode would not contain sufficient quantities of electrolyte to properly sustain the water consuming reaction in the cathode. Furthermore, high active material loadings with conventional particle size distributions result in higher mass transfer polarization due to the low porosity of these anodes, leading to early anode passivation and premature failure.

Conventional anode active materials may contain particles having a wide distribution of particle sizes, which range for example from a few microns (e.g., about 5 microns, about 10 microns, about 15 microns, about 25 microns or up) up to about 500 microns, about 750 microns or even about 1000 microns. Typically, however, most of the particles of the anode active material fall within a size distribution ranging between about 25 microns and about 500 microns.

Additionally, it may be advantageous to employ an anode active material which has a smaller particle size, and/or a narrower particle size distribution. For example, it may be useful in one or more embodiments of the disclosure if the anode active material particles having a size distribution wherein at least about 70%, about 75%, about 80%, about 85%, about 90%, about 95% or even about 100% of the particles have a standard mesh-sieved particle size that is within about ±200 microns, about ±150 microns, about ±100 micron size range or less (e.g., about 90 microns, about 70 microns, about 50 microns or less) of a given target particle size (e.g., about 50 microns, about 100 microns, about 150 microns, about 200 microns, about 250 microns, or about 300 microns). For example, in one or more embodiments, it may be advantageous to use anode active material particles wherein between about 90% and 95%, or even about 100%, of the particle sizes, by weight, are within about a 200, 150, or even 100 microns of a target particle size of about 50 microns, about 100 microns, about 150 microns, about 200 microns, about 250 microns, or about 300 microns.

In this regard one skilled in the art will recognize that mesh sizes corresponding to these particle sizes can be identified using ASTM Designation B214-99. An anode containing active material particles having a more narrow particle size distribution, such as those noted above, may be well-suited for use in combination with, for example, a copper oxide-containing cathode, as detailed elsewhere herein, because such a cathode is one example of a cathode that consumes less water than alkaline manganese dioxide cells. Such an anode may be "drier" than conventional electrochemical cells, meaning that the anode has a higher loading of anode active material particles that can be efficiently discharged with reduced electrolyte concentrations. Such an anode/cathode combination may be particularly advantageous because, due to the copper oxide, or a mixed copper oxide, active material in the cathode is low-water consuming, and thus the amount of electrolyte required in the anode may be reduced relative to, for example, a conventional zinc manganese dioxide alkaline cell. The low-water consuming reaction advantageously permits an increase in anode active material loading in the anode and thereby facilitates a longer cell service life.

Another factor that may impact cell performance relates to the surface area of the anode, with smaller particles typically increasing the effective surface area of the anode. More specifically, increasing the active anode electrode surface area provides sufficient active reaction sites needed to keep up with the cathode reaction at high discharge rates. Accordingly, it is desirable to provide cells having a predetermined amount of anode active material particles, which in some embodiments are in the form of zinc or a zinc alloy. The concentration of anode active material in the anode may vary for a given application, and/or electrochemical cell configuration. Typically, however, the total amount of anode active material present in the anode, or more generally the amount of anode active material, is at least about 50 wt %, about 60 wt %, about 70 wt %, or about 80 wt %, the concentration for example being between about 50 wt % and about 80 wt %, between about 55 wt % and about 75 wt %, or between about 60 wt % and about 70 wt % (e.g., about 64 wt %, about 66 wt %, or about 68 wt %), based on the total weight of the anode. Thus, in some embodiments, the anode active material is present in the gelled anode mixture at a concentration of from about 55% to about 75% by weight, based on the total weight of the gelled anode mixture.

As noted herein, this anode active material may have a range of particle sizes, and/or particle size distributions. For example, the anode may comprise anode active material particles having a particle size of less than about 75 microns (−200 mesh size), which may be referred to herein as "fines." In particular, anode active material particles that pass through a 200 mesh screen size, and thus have a particle size of less than about 75 microns, may be present in the anode in an amount of, for example, less than about 10 wt % or about 5 wt %, relative to the total zinc in the anode (including coarse zinc particles, or zinc particles having a particle size of greater than about 75 microns), and in some embodiments may be present in the anode in an amount of between about 1 wt % and about 10 wt %, or between about 2 wt % and about 8 wt %, or between about 3 wt % and about 6 wt %.

It is to be noted that mesh sizes are stated herein to specify a range of particle sizes. For example, "−200 mesh" generally indicates particles smaller than about 75 microns, while "+200 mesh" generally indicates particles larger than about 75 microns.

It is to be further noted that, additionally or alternatively, desirable results may also be achieved using an amount of anode active material fines (e.g., zinc) greater than about 10 wt % (e.g., about 150, about 20 wt %, about 30 wt %, about 40 wt %, or even about 50 wt %), based on the total weight of anode active material present in the anode. The use of fines may be particularly useful when, for example, the particle size of the other active material particles (i.e., coarse zinc particles) being used is, for example, between about 75 and about 105 microns (+75 and −140 mesh size). These coarse particles may be present in an amount between, for example, about 1 wt % and about 50 wt %, or between about 10 wt % and about 40 wt %, based on the total weight of anode active material present in the anode.

It is to be still further noted that multiple ranges of anode active material particles having a diameter less than about 105 microns (−140 mesh size), including particles between about 75 and about 105 microns (+200 and −140 mesh size) and fines less than about 75 microns (−200 mesh size), may be used to increase cell performance. For instance, the anode may include active material particles between about 75 and about 105 micrometers, with the advantages in cell performance being enhanced when the anode gel has a low electrolyte concentration, as detailed elsewhere herein. When fines have a size between the range of about 20 and about 75 micrometers (+625 and −200 mesh size), or alternatively between about 38 and about 75 micrometers (+400 and −200 mesh size), cell performance may be particularly enhanced when the electrolyte concentration is low, as detailed elsewhere herein.

In some embodiments of the present disclosure, from about 5% to about 35%, by weight of the total anode active material present in the gelled anode mixture have a particle size of less than about 75 microns. In other embodiments, from about 10% to about 25%, by weight, of the total anode active material present in the gelled anode mixture have a particle size of less than about 75 microns. In yet other embodiments, greater than about 10%, by weight, of the total anode active material present in the gelled anode mixture have a particle size of less than about 45 microns. In other embodiments of the present disclosure, from about 8% to about 35%, by weight, of the anode active material present in the gelled anode mixture have a particle size of less than about 75 microns. In yet other embodiments, from about 10% to about 21%, by weight, of the anode active material present in the gelled anode mixture have a particle size of less than about 75 microns.

2. Apparent Density/Aspect Ratio

In the electrochemical cells of the present disclosure, the anode active material has an apparent density that leads to cell performance improvements compared to those of the prior art. The apparent density of the anode active material is an important characteristic of the present disclosure. Specifically, for example, reducing the apparent density of the anode active material below conventional levels enhances the anode discharge efficiency at high drains of discharge. High rate discharge performance is dependent on the availability of sufficient anode reaction sites in the vicinity of the anode-cathode interface. Though, in some instances, this may be accomplished by increasing the level of anode active material fine particles, increasing the level of fines has a limit to improving performance because the discharge product around the fine particles disrupts particle-to-particle contact and also tends to suppress ion diffusion, which can be an essential step to sustain fast anode/cathode reactions demanded by high drain rates. In accordance with the present disclosure, anode reaction sites can be increased, and thus high rate discharge of the cells enhanced, by enlarging the anode surface area through the use of low apparent density anode active material.

Apparent density is the weight per unit volume of a given material (e.g., anode active material). The apparent density may be measured, for example, by ASTM B212-13, Standard Test Method for Apparent Density of Free-Flowing Metal Powders Using the Hall Flowmeter Funnel.

Further, proper control of the anode active material apparent density according to the present disclosure increases the anode reaction sites in the vicinity of the anode-cathode interface. Within the cell, the reaction progresses from the anode-cathode interface towards the core central part of the anode and from the cathode-anode interface towards the can-cathode interface in cylindrical cells. As the reaction progresses, oxidized anode active material product (e.g., zinc oxide) forms and the electrolyte is rapidly consumed forming a dry discharge product that tends to impair diffusion of reactants toward the anode core and/or toward the can-cathode interface.

High drain discharge of cells can be accomplished by performing the Digital Still Camera (DSC) test, which is generally known in the art of electrochemical cells. The DSC test applies a pulse load of 1500 mW for 2 seconds followed by 650 mW for 28 seconds for 5 minutes every hour until the cell closed circuit voltage reaches 1.05 V. Another exemplary high drain test known in the industry is a Photo Pulse test, which applies 1 Amp of load for 10 seconds each minute for one hour daily until the cell closed circuit voltage reaches 0.9 V.

In accordance with the present disclosure, electrochemical cell performance, as well as DSC performance, is improved by adjusting the apparent density of the anode active material. Specifically, in some embodiments of the present disclosure the anode active material apparent density is adjusted to levels below 3.00 grams/cubic centimeter (g/cc). In some embodiments of the present disclosure, the anode active material apparent density is decreased by progressively increasing the percentage of small and relatively large elongated anode active material particles. It has been surprisingly found by the present disclosure that elongated anode active material particles improve packing, enhance particle-to-particle contact, and increase active anode reaction sites that are necessary for high drain capability.

Accordingly, in some embodiments of the present disclosure, the anode active material has an apparent density below about 3.00 g/cc. In other embodiments, the anode active material has an apparent density of from about 2.55 g/cc to about 2.95 g/cc, in some embodiments from about 2.65 g/cc to about 2.85 g/cc, in some embodiments about 2.95 g/cc, in some embodiments about 2.85 g/cc, and in some embodiments about 2.70 g/cc. In yet other embodiments, the anode active material has an apparent density of about 2.71 g/cc; in some embodiments about 2.83 g/cc; and in some embodiments about 2.94 g/cc. In still other embodiments, the anode active material has an average apparent density of about 2.70 g/cc; in other embodiments an average apparent density of about 2.80 g/cc; and in yet other embodiments an average apparent density of about 2.95 g/cc.

In order to achieve a low apparent density of the anode active material, in some embodiments of the present disclosure, the level of elongated anode active material particles is increased. The aspect ratio of the anode active material can be quantified by the length of an anode active material particle divided by the thinnest width of an anode active material particle. Specifically, the level or fraction of elongated anode active material particles with an aspect ratio greater than 10.0 is increased. In some embodiments, this fraction of anode active material elongated particles can have aspect ratios of from about 10.0 to about 50.0, and in some embodiments can be from about 15.0 to about 30.0. In other embodiments, said aspect ratio may be from about 10.0 to about 40.0. In yet still other embodiments, the aspect ratio may be from about 30.0 to about 50.0. Thus, the anode active material in accordance with the present disclosure can comprise particles having an aspect ratio of from about 10.0 to about 50.0, from about 10.0 to about 40.0, from about 15.0 to about 30.0, and/or from about 30.0 to about 50.0.

Figure 9:
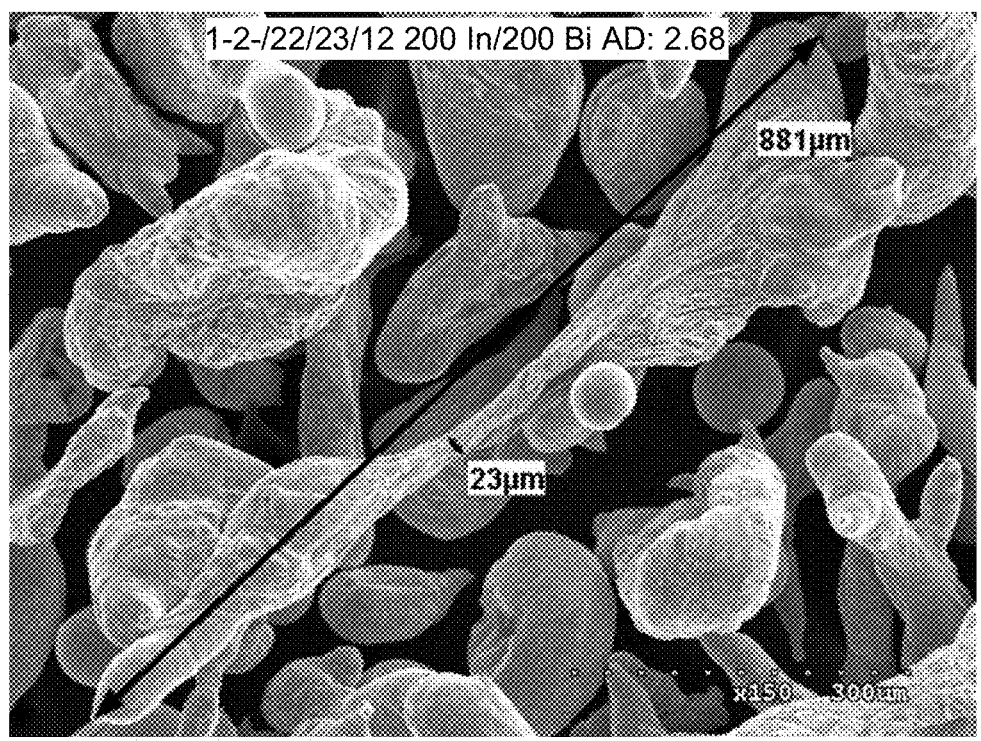
FIG. 9 depicts the aspect ratio of an exemplary anode active material in accordance with the present disclosure at an apparent density of 2.68 g/cc.

The larger the amount of elongated anode active material particles in the anode active material, the higher the fraction of particles with high aspect ratio and the lower the apparent density of the anode active material. For example, in some embodiments of the present disclosure, as disclosed in FIG. 9, the anode active material will contain particles that are from about 800 microns to about 1000 microns long and from about 20 microns to about 25 microns wide, for an aspect ratio of from 30.0 to about 50.0.

Figure 8A:
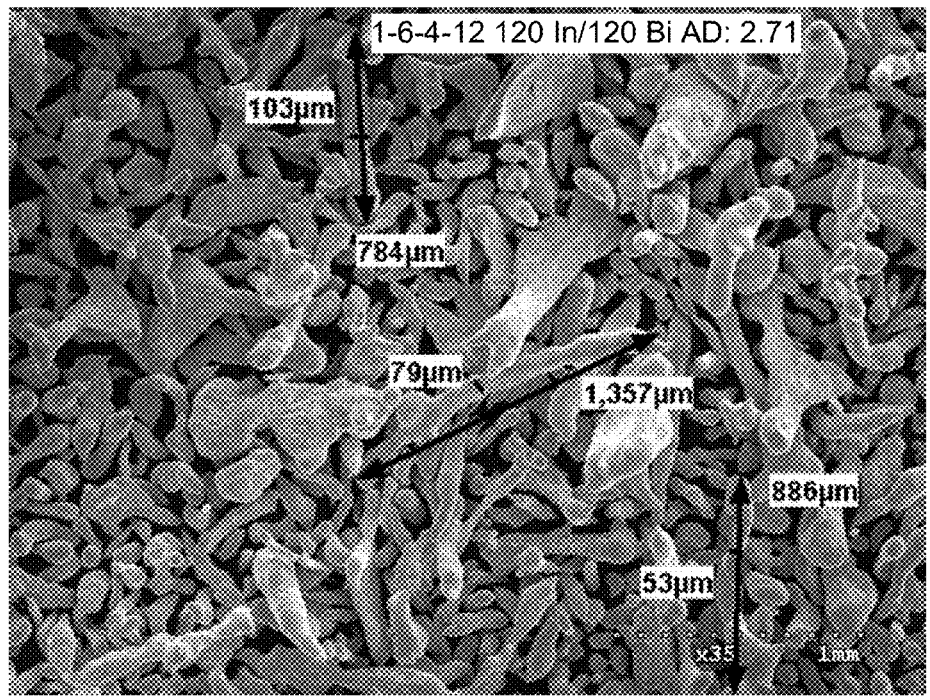
FIG. 8A depicts the aspect ratio of an exemplary anode active material in accordance with the present disclosure at an apparent density of 2.71 g/cc.
Figure 8B:
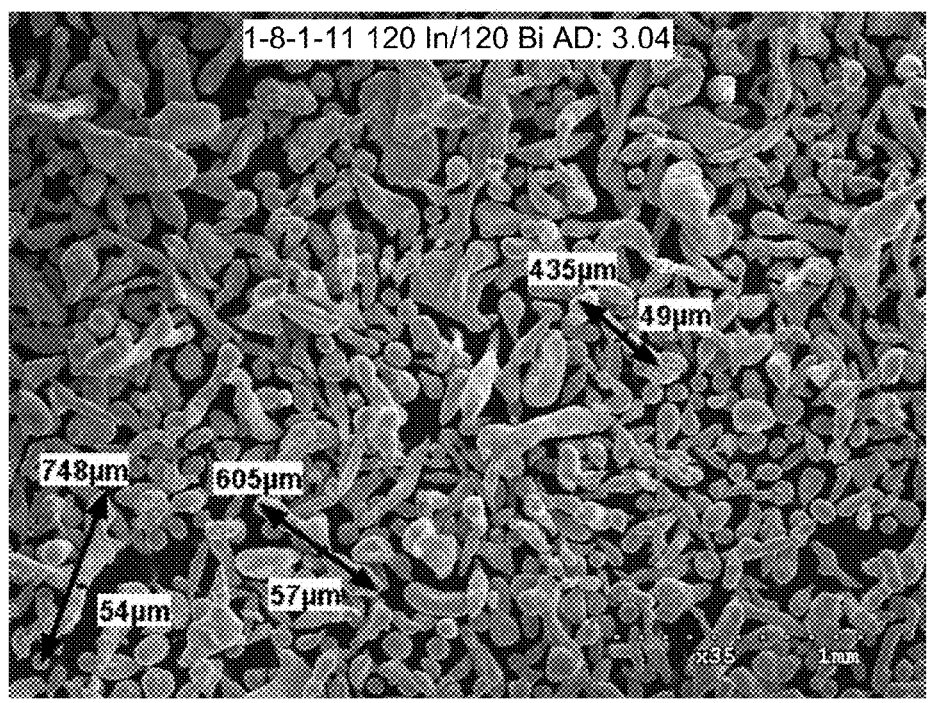
FIG. 8B depicts the aspect ratio of an exemplary anode active material in accordance with the present disclosure at an apparent density of 3.04 g/cc.

Moreover, as can be seen in the comparison of FIG. 8A and FIG. 8B, when the anode active material apparent density is less than 3.0 g/cc (i.e., 2.71 g/cc in FIG. 8A), the fraction of elongated particles with an aspect ratio greater than 10.0 is larger than that exhibited by a powder with an apparent density of 3.04 g/cc (FIG. 8B). As can be seen in the figures, this is due to the amount of more elongated particles in FIG. 8A, which in turn produces a lower apparent density material.

Figure 7A:
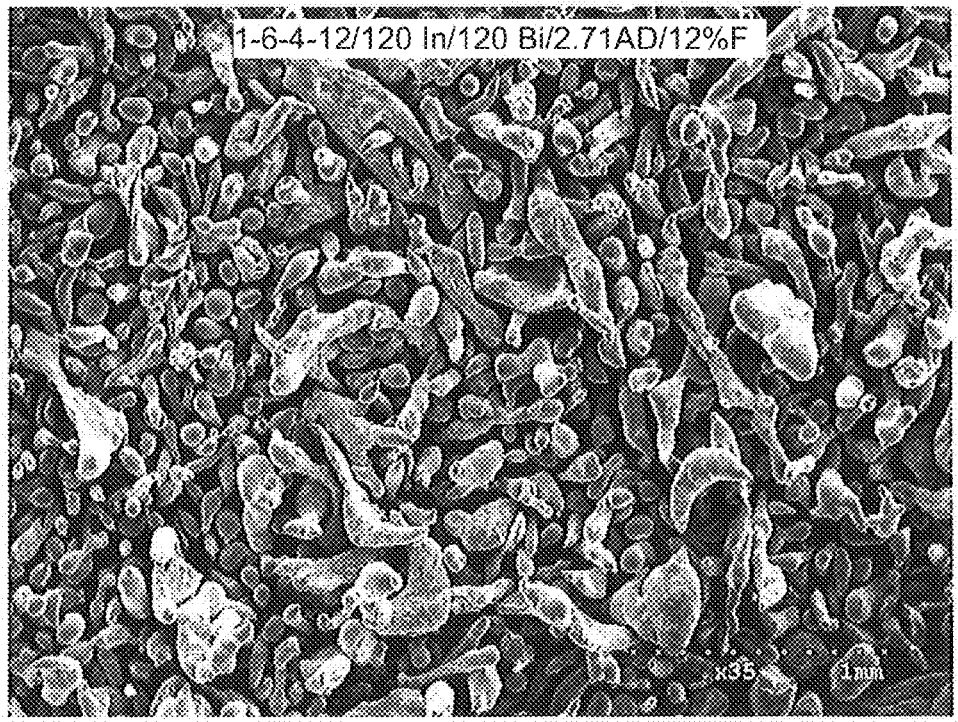
FIG. 7A is a micrograph of the particle size distribution of an exemplary anode active material having an apparent density of 2.71 g/cc.
Figure 7B:
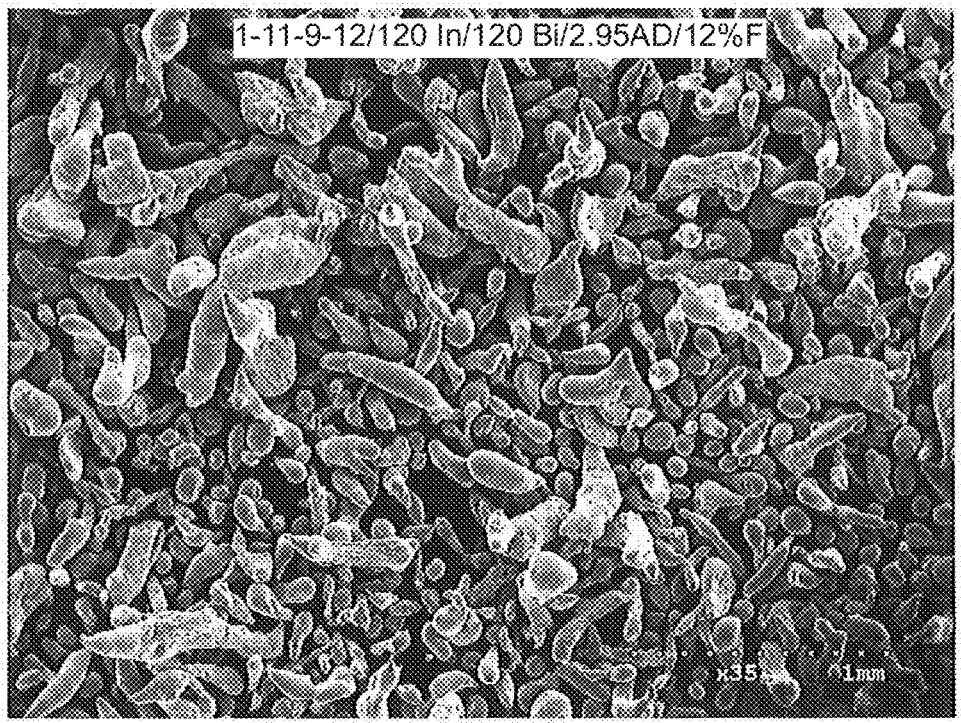
FIG. 7B is a micrograph of the particle size distribution of an exemplary anode active material having an apparent density of 2.95 g/cc.

Further, examples of anode active material powders with relatively large elongated particles according to this disclosure can also be seen in FIGS. 7A and 7B. FIG. 7A shows the particle size distribution of a zinc alloy comprising 120 ppm of bismuth and 120 ppm of indium with an apparent density of 2.71 g/cc. FIG. 7B shows the particle size distribution of a zinc alloy comprising 120 ppm of bismuth and 120 ppm of indium with an apparent density of 2.95 g/cc.

3. Electrolyte

With respect to the type and concentration of the electrolyte in the gelled anode, as previously noted, the gelled anode of the present disclosure includes an alkaline electrolyte, and in some embodiments an alkaline electrolyte having a relatively low hydroxide content. Suitable alkaline electrolytes include, for example, aqueous solutions of potassium hydroxide, sodium hydroxide, lithium hydroxide, as well as combinations thereof. In one particular embodiment, however, a potassium hydroxide-containing electrolyte is used. In other embodiments, the alkaline electrolyte comprises water and potassium hydroxide.

Also, as previously noted, electrolytes utilized in accordance with the present disclosure typically have a hydroxide (e.g., potassium hydroxide) concentration of about 35%, about 30% or less (e.g., about 29%, about 28%, about 27%, about 26%, or even about 25%), based on the total electrolyte weight. However, typically the electrolyte has a hydroxide concentration of between about 25% and about 35%, or between about 26% and about 30%. In one particular embodiment (e.g., a gelled anode suitable for use in a cell sized and shaped as, for example, an AA or AAA cell), the hydroxide concentration of the electrolyte is about 28% by weight, based on the total weight of the electrolyte.

In this regard it is to be noted that the concentration of the relatively low hydroxide content electrolyte in the gelled anode is generally at or near that of conventional gelled anodes, the concentration for example typically being at least about 24% by weight, at least about 26% by weight, or at least about 28% by weight, and less than about 34% by weight, less than about 32% by weight, or less than about 30% by weight, based on the total weight of the gelled anode. The concentration of the electrolyte in gelled anodes of the present disclosure may, therefore, typically be within the range of from about 24% by weight to about 34% by weight, from about 26% by weight to about 32% by weight, or from about 28% by weight to about 30% by weight, based on the total weight of the gelled anode. The desired concentration of electrolyte in the gelled anode generally depends on a variety of factors including, for example, the concentration of zinc in the gelled anode.

B. Gelling Agent

Without being held to any particular theory, it is generally believed that one or more characteristics of the gelling agent (e.g., the density or viscosity thereof) utilized in accordance with the present disclosure contribute, at least in part, to its suitability for use in a gelled anode, particularly one having a relatively low potassium hydroxide content. More specifically, it is generally believed that the highly crosslinked gelling agent imparts a rigid-type gel structure and a slightly decreased packing density to the gelled anode within the cell, as well as a corresponding greater but more stable anode particle-to-particle distance than provided by conventional gelling agents. These features of the anode gels are believed to contribute to improved reactant transport and wettability throughout the anode gel, enhancing cell discharge performance. In particular, the gelled anode of the present disclosure is believed to contribute to improved transport of hydroxyl ions throughout the anode mass during cell discharge, which is generally preferred under certain conditions including, for example, high rate intermittent or continuous discharge. As further detailed elsewhere herein, various features of the gelling agent may be indicators of the suitability of these gelling agents for use in a gelled anode having relatively low potassium hydroxide content, including for example the degree of crosslinking in the gelling agent, and/or the viscosity and/or density thereof.

Generally speaking, the gelling agent of the present disclosure is a highly crosslinked, polymeric chemical compound that has negatively charged acid groups. The function of these acid groups is to expand the polymer backbone into an entangled matrix. When these acid groups are ionized in the anode, they repel each other and the polymer matrix swells to provide a support mechanism. One gelling agent particularly well-suited for use in accordance with the present disclosure is a polyacrylic acid gelling agent having a high degree of crosslinking therein, or a degree of crosslinking which is greater than that present in conventionally employed gelling agents (such as for example those commercially available under the name Carbopol™). In particular, more highly crosslinked polyacrylic acid gelling agents, commercially available under the name Flogel™ (e.g., Flogel™ 700 or 800) from SNF Holding Company (Riceboro, Ga.), are suitable for use in accordance with the present disclosure.

In addition to the increased degree of crosslinking present in the gelling agent (as compared, for example, to those commercially available under the name Carbopol™), additional advantageous features of the gelling agent are its viscosity and/or density. Generally speaking, the viscosity and/or the density of the gelling agent utilized in the present disclosure is/are greater than that of conventionally employed gelling agents. For example, the viscosity of suitable gelling agents at about 25° C. is generally at least about 40,000 centipoise (cp), at least about 45,000 cp, at least about 50,000 cp, or at least about 55,000 cp. In accordance with certain embodiments of the present disclosure, however, the viscosity of suitable gelling agents is at least about 58,000 cp, about 60,000 cp, about 62,000 cp, about 64,000 cp, about 66,000 cp, about 68,000 cp, or even about 70,000 cp. Accordingly, the viscosity of suitable gelling agents may generally range, for example, from about 50,000 cp to about 70,000 cp, from about 60,000 cp to about 68,000 cp, or from about 62,000 cp to about 66,000 cp, at about 25° C.

As previously noted, the viscosities of gelling agents reported herein are with reference to the viscosity of a 0.5 wt. % aqueous solution of the gelling agent and may be measured using means conventionally known in the art including, for example, using a viscometer commercially available from Brookfield Engineering Laboratories, Inc. (Middleboro, Mass.) under standard conditions. For example, a RVT Brookfield viscometer having a No. 5 spindle and operated at 1 revolution per minute (rpm) may be used to measure the viscosity of aqueous solutions containing gelling agents of the present disclosure. This and other suitable apparatus may also be used to measure the viscosity of gelled anodes of the present disclosure.

With respect to the bulk density of suitable gelling agents (i.e., the density of the gelling agent in powder form), it is to be noted that this is generally at least 0.21 grams/cubic centimeter (g/cc), and may be at least 0.22 g/cc, at least 0.23 g/cc, at least 0.24 g/cc, at least 0.25 g/cc or more (e.g., about 0.26, 0.28, 0.3 or more g/cc). Typically, however, the density of suitable gelling agents is from 0.22 g/cc to about 0.3 g/cc, or from 0.24 g/cc to about 0.28 g/cc. In this regard it is to be noted that the bulk density of gelling agents of the present disclosure may be determined using means and apparatus known in the art including, for example, the method described in ASTM C29/C29M-97 (2003), but generally are determined by measuring the mass of a predetermined volume of the gelling agent. The bulk density of gelled anodes of the present disclosure may generally be determined in the same or a similar manner.

The concentration of the gelling agent in the anode, and more specifically the gelled anode, may be optimized for a given use. Typically, however, the concentration of the gelling agent in the gelled anode is at least about 0.40 weight %, based on the total weight of the gelled anode, and may be at least about 0.50 weight %, at least about 0.55 weight %, at least about 0.6 weight %, at least about 0.625 weight %, at least about 0.65 weight %, at least about 0.675 weight %, at least about 0.7 weight % or more. For example, in various embodiments the concentration of the gelling agent in the gelled anode may be from about 0.40% to about 0.75%, or between about 0.50% and 0.75%, or between about 0.6% and about 0.7%, or between about 0.625% and about 0.675%, by weight of the gelled anode. In one particular embodiment, the concentration is about 0.60 weight % (when for example it is used in combination with an absorbent as a gelled anode component), while in another embodiment the concentration is between about 0.62 and about 0.66 weight % (when for example it is used without an absorbent as a gelled anode component).

In addition to the degree of crosslinking, the viscosity and/or density, the gelling agent of the present disclosure may also be characterized by the flow properties (e.g., viscosity) and/or the density of the gelled anode of which it is a part. For example, with respect to the flow properties of the gelled anode, it is to be noted that, in addition to increased viscosity of the gelling agent of the present disclosure (as compared to a conventional gelling agent), the viscosity of freshly-made gelled anodes of the present disclosure containing such an agent may, in at least some embodiments, typically be greater than that of a freshly-made, conventional gelled anode. Generally, the initial viscosity of freshly-made gelled anodes of the present disclosure at 25° C. is at least about 60,000 cp, at least about 80,000 cp, or at least about 100,000 cp. More particularly, the initial viscosity of freshly-made gelled anodes of the present disclosure at 25° C. is typically at least about 120,000 cp, at least about 160,000 cp, at least about 180,000 cp, at least about 200,000 cp, at least about 240,000 cp, at least about 280,000 cp, or at least about 300,000 cp. For example, the initial viscosity of a gelled anode of the present disclosure at 25° C. may be in the range of from about 120,000 cp to about 360,000 cp, from about 160,000 cp to about 320,000 cp, from about 180,000 cp to about 300,000 cp, from about 200,000 cp to about 280,000 cp, or from about 220,000 cp to about 260,000 cp.

In this regard, it is noted that "initial" viscosity of a freshly-made gelled anode refers to viscosity of the gelled anode determined before storage of the anode for any significant period of time. In particular, initial viscosity refers to the viscosity of the gelled anode determined within about 15 minutes of its preparation, within about 30 minutes of its preparation, within about 45 minutes of its preparation, or within about 60 minutes of its preparation.

As a result of the viscosity of the gelling agent of the present disclosure, an anode gel prepared using this gelling agent is typically more rigid than a gel prepared using a conventional gelling agent, particularly after being stored for a period of time. For example, using means known in the art, it may be observed that a conventionally prepared anode gel (e.g., one prepared using a similar amount of, for example, a Carbopol™ agent, such as Carbopol™ 940) may exhibit an initial viscosity (i.e., a viscosity measured immediately after preparation) similar to the initial viscosity of the gelled anode of the present disclosure. In contrast, however, while the conventionally prepared gelled anode may exhibit little change in viscosity after having been prepared and stored at room temperature (e.g., about 20-25° C.) for a period of time, the gelled anode of the present disclosure may, after having been stored at about room temperature for essentially the same period of time (e.g., at least about 8 hours, about 12 hours, about 18 hours or even about 24 hours), exhibits a viscosity that has increased, relative to the initial viscosity, by at least about 20%, at least about 30%, at least about 40%, at least about 50%, at least about 60%, at least about 70%, or at least about 80%. For example, in various embodiments, the viscosity of the gelled anode of the present disclosure may increase after storage by from about 20% to about 80%, from about 30% to about 70%, from about 40% to about 60%, or from about 45% to about 55%.

It is to be further noted that, in accordance with the above description of initial viscosities of gelled anodes of the present disclosure, and viscosities after storage, it has been observed that before and/or after incorporation into an electrochemical cell, gelled anodes of the present disclosure generally exhibit a viscosity of at least about 125,000 cp, at least about 150,000 cp, at least about 200,000 cp, at least about 225,000 cp, at least about 250,000 cp, at least about 275,000 cp, at least about 300,000 cp, at least about 325,000 cp, at least about 350,000 cp, at least about 375,000 cp, at least about 400,000 cp, at least about 410,000 cp, at least about 420,000 cp, or more. Typically, however, gelled anodes of the present disclosure exhibit a viscosity of between at least about 125,000 cp and less than 500,000 cp, of from about 175,000 cp to about 450,000 cp, from about 300,000 cp to about 425,000 cp, from about 325,000 cp to about 400,000 cp, from about 340,000 cp to about 390,000 cp, or from about 350,000 cp to about 375,000 cp.

It is to be noted that viscosities and densities of the gelled anode reported herein may be determined using conventional means known in the art (including, for example, the apparatus described above for use in measuring the viscosity of gelling agents of the present disclosure).

C. Additional Anode Components

A gelled anode of the present disclosure may also employ other components or additives, in addition to the gelling agent and the anode active material and the electrolyte. For example, in one particular embodiment, an absorbent (e.g., superabsorbent) is employed. Without being held to any particular theory, it is generally believed that these materials generally absorb and retain water in the gelled anode and allow electrolyte to be retained near the anode active material (e.g., zinc); that is, the absorbent is believed to function as an electrolyte reservoir. It is also believed that absorbent material promotes contact between anode active material particles and promotes formation of a gelled anode in which these particles are in better electrical contact. When an absorbent material is present in the gelled anode, any or all of these features of the absorbent material are believed to enhance the performance of the gelled anode.

Suitable absorbent materials may be selected from those generally known in the art. Exemplary absorbent materials include those sold under the trade name Salsorb™ or Alcasorb™ (e.g., Alcasorb™ CL15), which are commercially available from Ciba Specialty (Carol Stream, Ill.), or alternatively those sold under the trade name Sunfresh™ (e.g., Sunfresh DK200VB), commercially available from Sanyo Chemical Industries (Japan).

Advantageously, the gelling agent of the present disclosure enables a reduced amount (e.g., about 30%, about 50% or even about 70% less) of an absorbent to be used to prepare a gelled anode, as compared for example to a conventional gelled anode and a gelling agent, to thereby reduce the cost of the gelled anode. For example, generally the concentration of absorbent in gelled anodes of the present disclosure is less than about 0.2%, less than about 0.15%, less than about 0.125%, less than about 0.1%, less than about 0.075%, less than about 0.05%, less than about 0.025%, or even less than about 0.01%, of the total anode weight. Typically, however, the concentration of absorbent in the gelled anode of the present disclosure is from about 0.01% to about 0.2% by weight, from about 0.025% to about 0.15% by weight, or from about 0.05% to about 0.1% by weight. For example, in various embodiments the gelled anode may comprise 0.04 wt %, or about 0.05 wt %, or about 0.06 wt %, of an absorbent material.

As a result of the reduced concentration of absorbent, and/or the increased concentration of gelling agent, present in the gelled anode of the present disclosure, the weight ratio of the gelling agent to absorbent therein is generally greater than that associated with conventional gelled anodes. For example, in various embodiments the ratio of gelling agent to absorbent may be at least 3:1, at least about 3.5:1, at least about 4:1, at least about 5:1, at least about 7.5:1, at least about 10:1, or at least about 12.5:1. Typically, the ratio of gelling agent to absorbent is from at least 3:1 to about 25:1, from about 4:1 to about 22.5:1, from about 5:1 to about 20:1, from about 7.5:1 to about 17.5:1, or from about 10:1 to about 15:1.

In this regard it is to be noted that the concentration of the gelling agent and/or the absorbent may be adjusted for a given use, as a function of for example the electrolyte (e.g., potassium hydroxide) and/or zinc concentration, the desired flow properties (e.g., viscosity) and/or density.

In particular, it is to be noted that the concentration of the gelling agent in the gelled anode, the concentration of absorbent in the gelled anode, and the relative proportion of these two components of the gelled anode, may be inter-related and thus work in combination to affect the viscosity of the gelling agent. Accordingly, among the various embodiments of the present disclosure, the following exemplary combinations may be noted: (i) when the viscosity of the gelled anode is between at least about 300,000 cp and less than about 500,000 cp, the concentration of the gelling agent in the anode may typically be from about 0.40% to about 0.75%, the concentration of the absorbent in the gelled anode may typically be from about 0.01% to about 0.2% by weight, and/or the weight ratio of the gelling agent to the absorbent may typically be from 3:1 to about 25:1; (ii) when the viscosity of the gelled anode is between about 310,000 cp to about 475,000 cp, the concentration of the gelling agent in the gelled anode may typically be from about 0.40% to about 0.75%, the concentration of the absorbent in the gelled anode may typically be from about 0.01% to about 0.2% by weight, and/or the weight ratio of the gelling agent to absorbent may typically be from about 4:1 to about 22.5:1; (iii) when the viscosity of the gelled anode is from about 320,000 cp to about 450,000 cp, the concentration of the gelling agent in the gelled anode may typically be between about 0.50% and 0.75%, the concentration of the absorbent in the gelled anode may typically be from about 0.01% to about 0.2% by weight, and/or the weight ratio of the gelling agent to the absorbent may typically be from about 5:1 to about 20:1; (iv) when the viscosity of the gelled anode is from about 330,000 cp to about 425,000 cp, the concentration of the gelling agent in the gelled anode may typically be between about 0.6% and about 0.7%, the concentration of the absorbent in the gelled anode may typically be from about 0.025% to about 0.15% by weight, and/or the weight ratio of the gelling agent to the absorbent may typically be from about 7.5:1 to about 17.5:1; and/or (v) when the viscosity of the gelled anode is from about 340,000 cp to about 400,000 cp, the concentration of the gelling agent in the gelled anode may typically be between about 0.625% and about 0.675%, the concentration of the absorbent in the gelled anode may typically be from about 0.05% to about 0.1% by weight, and/or the weight ratio of the gelling agent to the absorbent may typically be from about 10:1 to about 15:1.

In addition to an absorbent material, the gelled anode may additionally or alternatively comprise a gassing inhibitor (e.g., organic inhibitor). In some embodiments of the present disclosure, the gassing inhibitor is a phosphate ester. In other embodiments, the gassing inhibitor is an organic phosphate ester. Suitable corrosion or gassing inhibitors include, for example, RHODAFAC® RM-510 and RHODAFAC® RS-610, which are commercially available from Rhodia (Boston, Mass.).

When used, the amount of gassing inhibitor present in the gelled anode may be determined or selected to optimize performance of the anode. Typically, however, the concentration of the inhibitor in the gelled anode will be at least about 10 ppm, about 25 ppm, about 50 ppm, about 100 ppm, about 150 ppm, about 200 ppm or more. In some embodiments, the concentration is in the range of about 10 ppm to about 150 ppm, or about 25 ppm to about 50 ppm, when for example a phosphate-type corrosion or gassing inhibitor is used. In some embodiments, the concentration of the inhibitor in the gelled anode mixture is about 35 ppm.

D. Electrolyte Preparation

The electrolyte may be prepared using methods generally known in the art. In accordance with the present disclosure, this preparation may for example involve forming an aqueous solution of a metal hydroxide salt, such as potassium, lithium or sodium hydroxide, and optionally a portion of the gelling agent (as detailed elsewhere herein). The electrolyte solution itself may comprise, for example, from about 20% to about 50%, and desirably from about 25% to about 40% of a hydroxide salt (e.g., potassium hydroxide), based on the total weight of the electrolyte.

The electrolyte fabrication process may include adding zinc oxide to the electrolyte solution, for example to reduce dendrite growth, which in turn reduces the potential for internal short circuits by reducing the potential for separator puncturing. Although in at least some of the embodiments described herein, the zinc oxide need not be provided in the electrolyte solution, as an equilibrium quantity of zinc oxide is ultimately self-generated in situ over time by the exposure of zinc to the alkaline environment and the operating conditions inside the cell, with or without the addition of zinc oxide per se. The zinc used in forming the zinc oxide is drawn from the zinc already in the cell, and the hydroxide is drawn from the hydroxyl ions already in the cell. Where zinc oxide is added to the electrolyte solution, the zinc oxide is typically present in an amount of from about 0.5% to about 4%, or about 1% to about 2%, based on the weight of the electrolyte solution, and may in some embodiments be about 2% by weight.

As previously noted, the gelled anodes of the present disclosure may also employ an absorbent (i.e., superabsorbent), and in at least some embodiments typically employ such an absorbent.

III. Cathode

In accordance with one or more embodiments of the present disclosure, a cathode suitable for use in an alkaline electrochemical cell as detailed herein may comprise at least one cathode active material. Other optional components, such as a binder, may be present in the cathode mixture, as well. The cathode active material may be amorphous or crystalline, or a mixture of amorphous and crystalline, and may be essentially any material generally recognized in the art for use in alkaline electrochemical cells. For example, the cathode active material may comprise, or be selected from, an oxide of copper, an oxide of manganese as electrolytic, chemical, or natural type (e.g., EMD, CMD, NMD, or a mixture of two or more thereof), an oxide of silver, and/or an oxide or hydroxide of nickel, as well as a mixture of two or more of these oxides or hydroxide. Suitable examples of positive electrode materials include, but are not limited to, $MnO_2$ (EMD, CMD, NMD, and mixtures thereof), NiO, NiOOH, $Cu(OH)_2$, cobalt oxide, $PbO_2$, AgO, $Ag_2O$, $Ag_2Cu_2O_3$, $CuAgO_2$, $CuMnO_2$, $CuMn_2O_4$, $Cu_2MnO_4$, $Cu_{3-x}Mn_xO_3$, $Cu_{1-x}Mn_xO_2$, $Cu_{2-x}Mn_xO_2$ (where x<2), $Cu_{3-x}Mn_xO_4$ (where x<3), $Cu_2Ag_2O_4$ and suitable combinations thereof.

In at least one embodiment of the present disclosure, the cathode mixture comprises an oxide of copper. In this regard it is to be noted that, as used herein, the term "copper oxide" is intended to refer to cupric oxide, where the copper has an oxidation state of about +2.

Conventional cathodes may typically include a binder. In those embodiments wherein a conventional binder is employed, it is typically in powder or particulate form. Generally, any conventional binder suitable for use in a cathode in an alkaline electrochemical cell may be used, provided it is suitably compatible with the other components therein. Such binders may include, for example, polyethylene binders (e.g., (i) low density PE, such as low density PE grade 1681-1, commercially from DuPont, (ii) high density PE, (iii) a mixture of low and high density PE), polyvinyl alcohol binders, as well as mixtures of one or more thereof.

In general, the type and concentration of the cathode active material, or materials when a mixture is used, as well as the type and concentration of the other components that may optionally be present in the cathode, will be selected in order to optimize the overall performance of the electrochemical cell of which the cathode is a part. Typically, however, the concentration of the active material, or total concentration of active materials when a mixture is used, may be between about 70 wt % and less than about 100 wt %, based on the total weight of the cathode, and may be between about 75 wt % and about 95 wt %, or about 80 wt % and about 90 wt %, of the total cathode weight. For example, in various embodiments the concentration of the cathode active material may be about 70 wt %, about 80 wt %, or about 90 wt %, based on the total weight of the cathode.

IV. Separator

Generally any separator material and/or configuration suitable for use in an alkaline electrochemical cell, and with the cathode and/or anode materials set forth herein above, may be used in accordance with the present disclosure. More particularly, one embodiment of the present disclosure includes a sealed separator system for an electrochemical cell that is disposed between a gelled anode of the type described here and a cathode containing soluble species of for example copper, silver, or both, as described above.

In this regard it is to be noted that the term "sealed separator system" is used herein to define a structure that physically separates the cell anode from the cathode, enables hydroxyl ions and water to transfer between the anode and cathode, limits transport other than through the material itself by virtue of a seam and bottom seal, and effectively limits the migration through the separator of some soluble species such as copper, silver, nickel, iodate, bismuth and sulfur species from the cathode to the anode. The choice of separator material and the need for a "sealed separator system" may depend, to some extent, upon the cathode active material in the cell, and whether or not anode-fouling species are produced. In a conventional alkaline cell using a manganese dioxide cathode where no significant anode fouling species are produced (other than those from minor trace impurities present), a film separator such as one made of polyvinyl alcohol or cellophane alone, in combination with each other, or in combination with a non-woven material may be used without a bottom or side seam seal so long as adequate measures are taken to prevent internal soft shorting by transport of fine particulates along or past the unsealed areas. The use of an adhesive, may optionally be used to effectively limit the crossover between the anode and cathode compartments over the top of the separator, by bonding or sealing the separator with the sealing assembly and/or container of the electrochemical cell, to effectively minimize physical and/or chemical transport between the anode and the cathode compartments of the cell.

It is to be noted that, in one alternative embodiment, the present disclosure is directed generally to a conventional alkaline electrochemical cell, or alternatively to an alkaline electrochemical cell which comprises one or more components that may form an anode fouling species in the cell, which comprises a thin film separator.

V. Cell Types

It should be understood that the gelled anodes of the present disclosure may be added to essentially any anode in any type of electrochemical cell including, but not limited to, zinc-manganese dioxide cells, zinc-silver oxide cells, metal-air cells including zinc in the anode, nickel-zinc cells, rechargeable zinc/alkaline/manganese dioxide (RAM) cells, zinc-copper oxide cells, or any other cell having a zinc-based anode. It should also be appreciated that the present disclosure is applicable to any suitable button-type cell, and/or any suitable cylindrical metal-air cell, such as those sized and shaped, for example, as AA, AAA, AAAA, C, and D cells.

VI. Cell Performance

As further detailed elsewhere herein, the electrochemical cells of the present disclosure have been observed to exhibit improved performance characteristics, which may be measured or tested in accordance with several methods under the American National Standards Institute (ANSI). Results of various tests of cells of the present disclosure are detailed below in the Examples.

The following Examples describe various embodiments of the present disclosure. Other embodiments within the scope of the appended claims will be apparent to a skilled artisan considering the specification or practice of the disclosure provided herein. It is therefore intended that the specification, together with the Examples, be considered exemplary only, with the scope and spirit of the disclosure being indicated by the claims, which follow the Examples.

EXAMPLES

In the Examples presented below, electrochemical cells of the present disclosure were tested for DSC performance, drop test amperage (both before and after the drop), partial discharge gassing and conditions after storage.

Example 1

DSC Performance with Alloys Containing Fines

Figure 2:
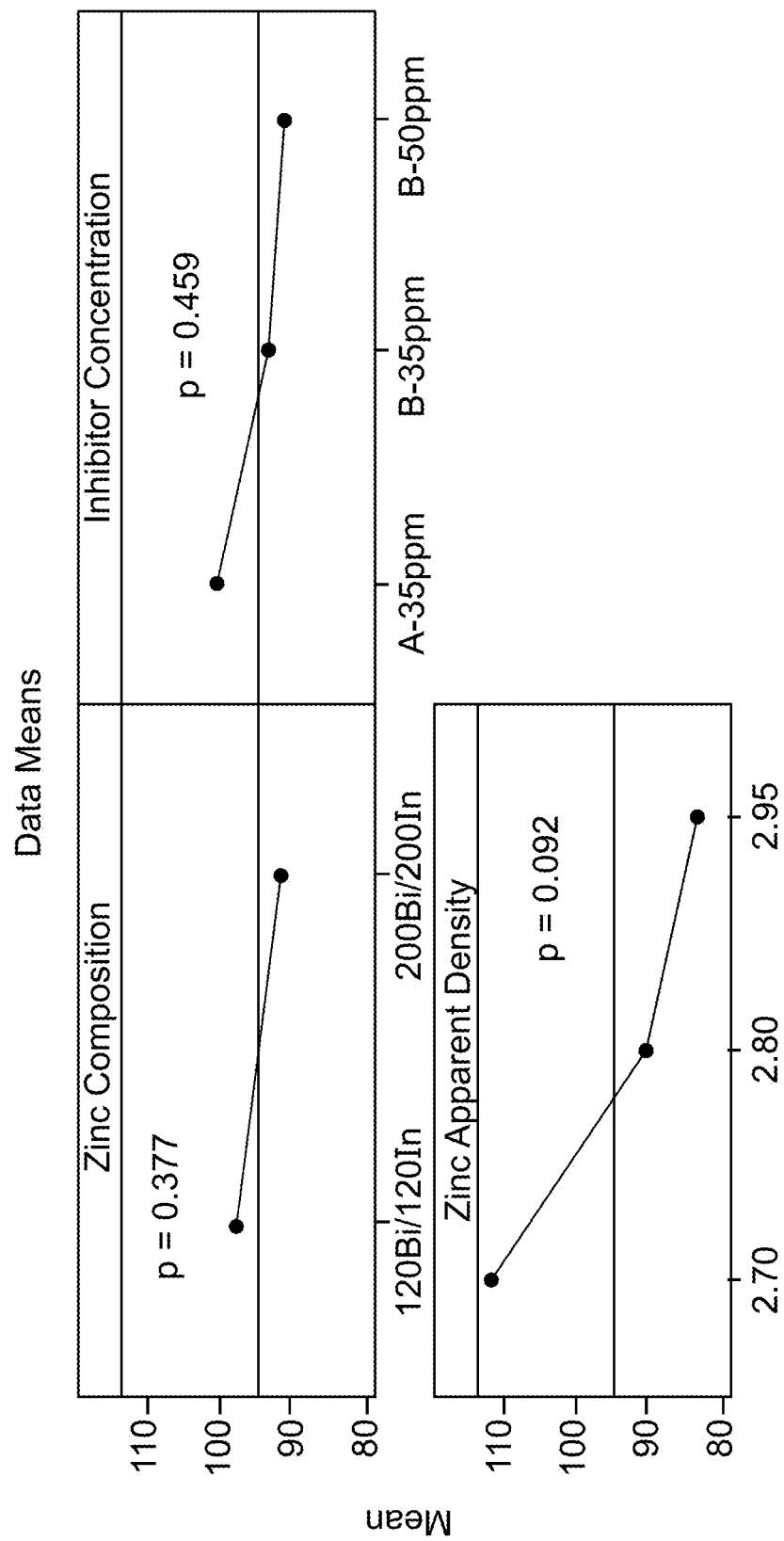
FIG. 2 shows graphical depictions of digital still camera performances including anodes in accordance with the present disclosure.

Gelled anodes were prepared in accordance with the improvements of the present disclosure. FIG. 2 displays the mean DSC pulse performance of LR6 cells made at three gassing inhibitor conditions with two different zinc alloys as the anode active material. The gassing inhibitors tested were RHODAFAC® RM-510 (A-35 ppm) and RHODAFAC® RS-610 (B-35 ppm and B-50 ppm). The two zinc alloys tested included 120 ppm of both bismuth and indium and 200 ppm of both bismuth and indium. The zinc apparent density values in FIG. 2 indicated as 2.70, 2.80 and 2.95 g/ml correspond to the average apparent density of the two alloys at about 2.71, 2.83 and 2.94 g/cc. The zinc alloys contained about 15%, by weight, of fine particles (i.e., particles having a size of about 75 microns or less).

As noted above, the three different apparent densities tested averaged 2.94 g/cc, 2.83 g/cc and 2.71 g/cc. As can be seen in FIG. 2, independent of the type of alloy and gassing inhibitor content, the DSC performance increased with decreased apparent density of the anode active material.

Example 2

Cell Amperage after Drop Test

Cells prepared in accordance with the specifications of Example 1 (i.e., same apparent densities, zinc alloys, fine %, gassing inhibitor content, etc.) were tested for their cell amperage after a drop test.

Figure 4:
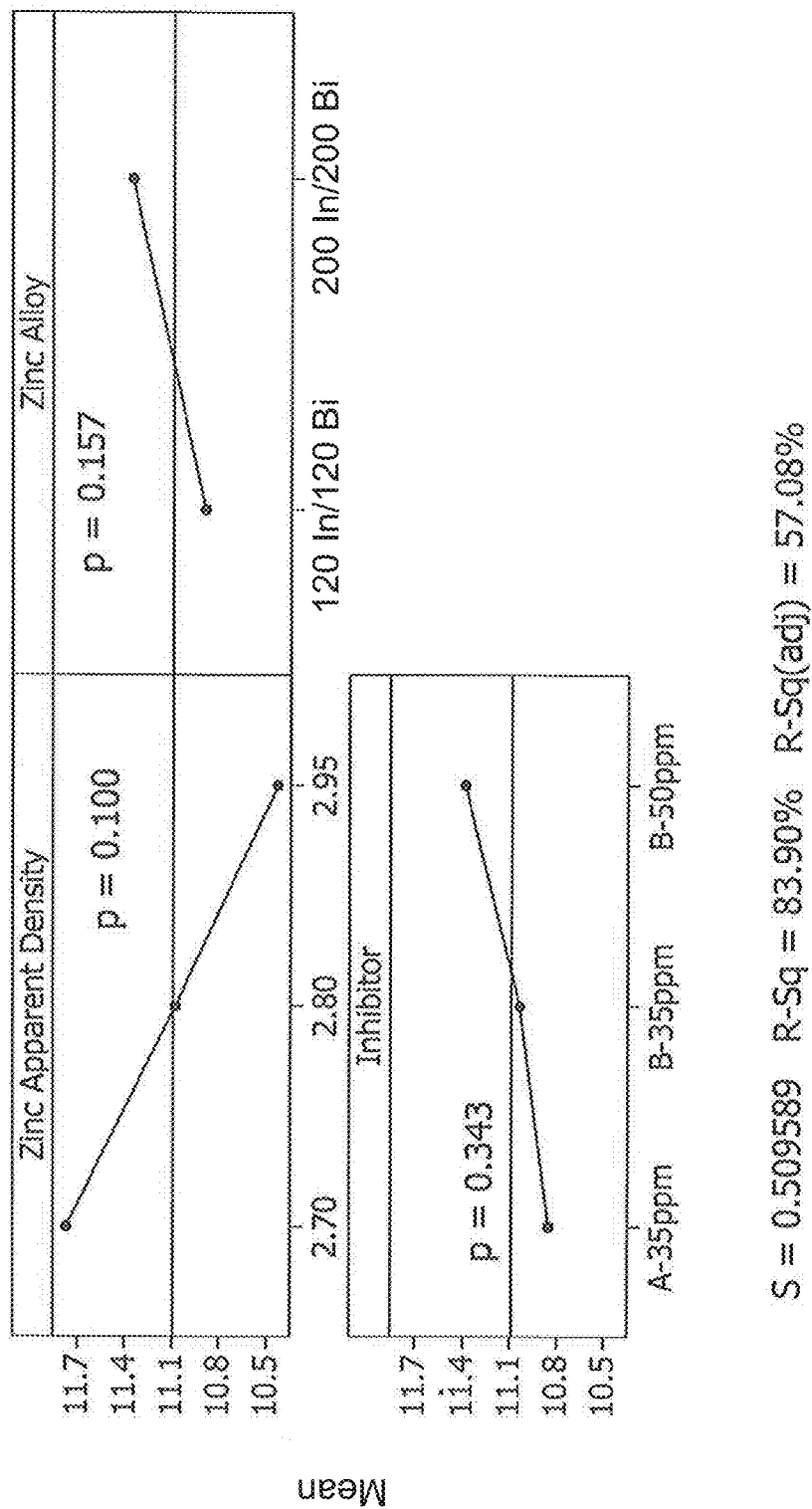
FIG. 4 shows graphical depictions of the cell amperage of exemplary cells including anodes in accordance with the present disclosure before drop tests.

Prior to the drop test, cell amperage of each cell was taken. Once again, as can be seen in FIG. 4 (which displays the mean cell amperage), cells with the lower apparent density had the higher cell amperage. This is in accord with the expectation of increased particle-to-particle contact with decreased apparent density. The zinc apparent density values in FIG. 4 indicated as 2.70, 2.80 and 2.95 g/ml correspond to the average apparent density of the two alloys at about 2.71, 2.83 and 2.94 g/cc.

For the drop test, the flash amps and open circuit voltage (OCV) of 15 AA batteries were recorded. Each battery was then rolled off of a flat surface 5 times from a height of about 102 cm onto a vinyl covered floor. The batteries were then allowed to rest for one hour. Then, the final flash amp and OCV readings were taken. In order to pass the drop test, the individual OCV readings may not decrease more than 20 mV, the average final amp results must be at least 70% of the initial average amp results, and all individual batteries must have at least a final amp value of 3.0 A. The amperage is checked again on each qualifying battery and the "post drop" amperage is compared to the initial amperage. The results are presented in FIG. 3 as the percentage of the initial amperage.

Figure 3:
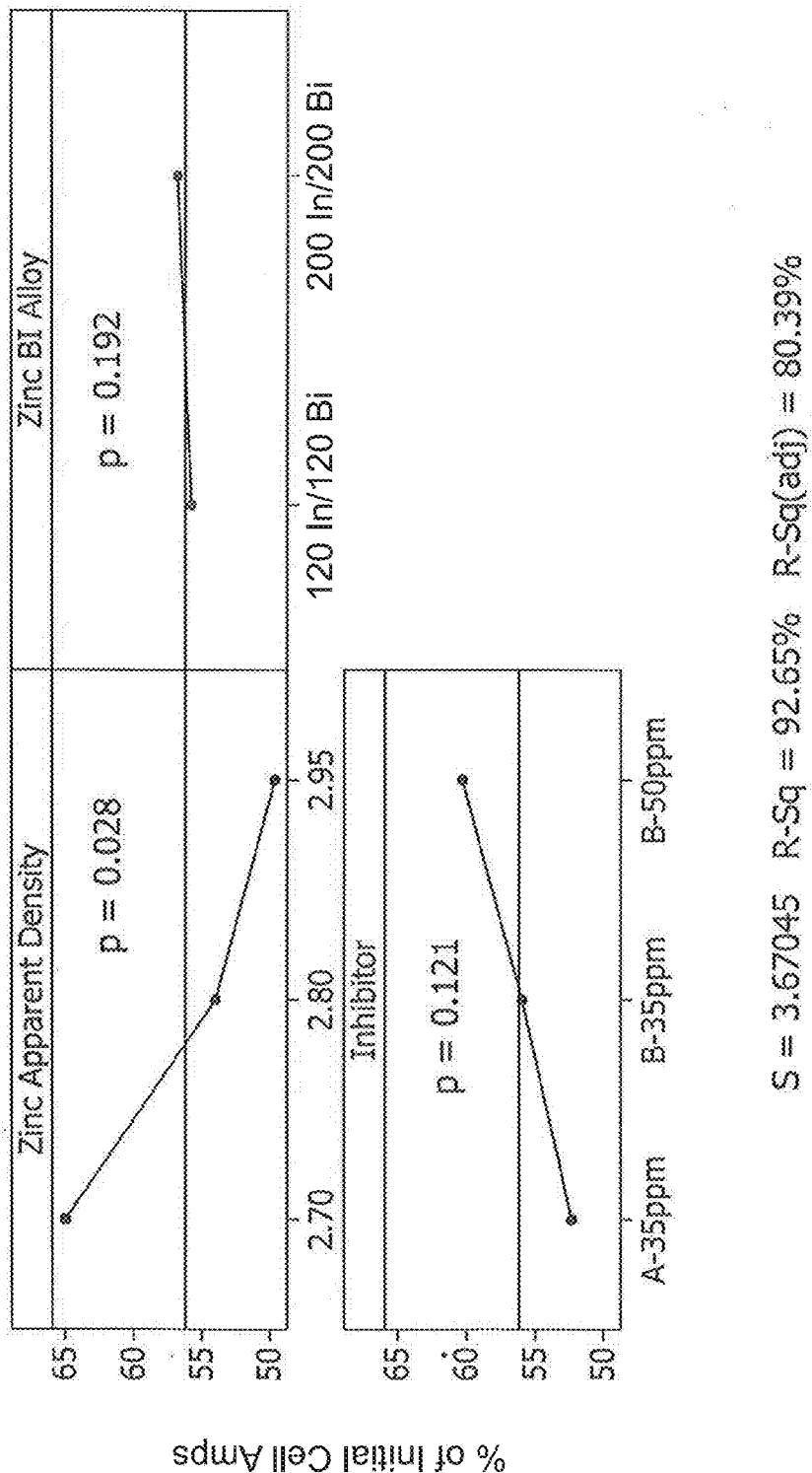
FIG. 3 shows graphical depictions of the cell amperage of exemplary cells including anodes in accordance with the present disclosure after drop tests.

The zinc apparent density values in FIG. 3 indicated as 2.70, 2.80 and 2.95 g/ml correspond to the average apparent density of the two alloys at about 2.71, 2.83 and 2.94 g/cc. As can be seen in FIG. 3, the cells with the lower apparent density have the highest percentage of cell amperage after being dropped.

Example 3

Partial Discharge Gassing of Cells

Cells prepared in accordance with the specifications of Example 1 (i.e., same apparent densities, zinc alloys, fine %, gassing inhibitor content, etc.) were tested for partial discharge gassing. The zinc apparent density values in FIG. 5 indicated as 2.70, 2.80 and 2.95 g/ml correspond to the average apparent density of the two alloys at about 2.71, 2.83 and 2.94 g/cc.

Figure 5:
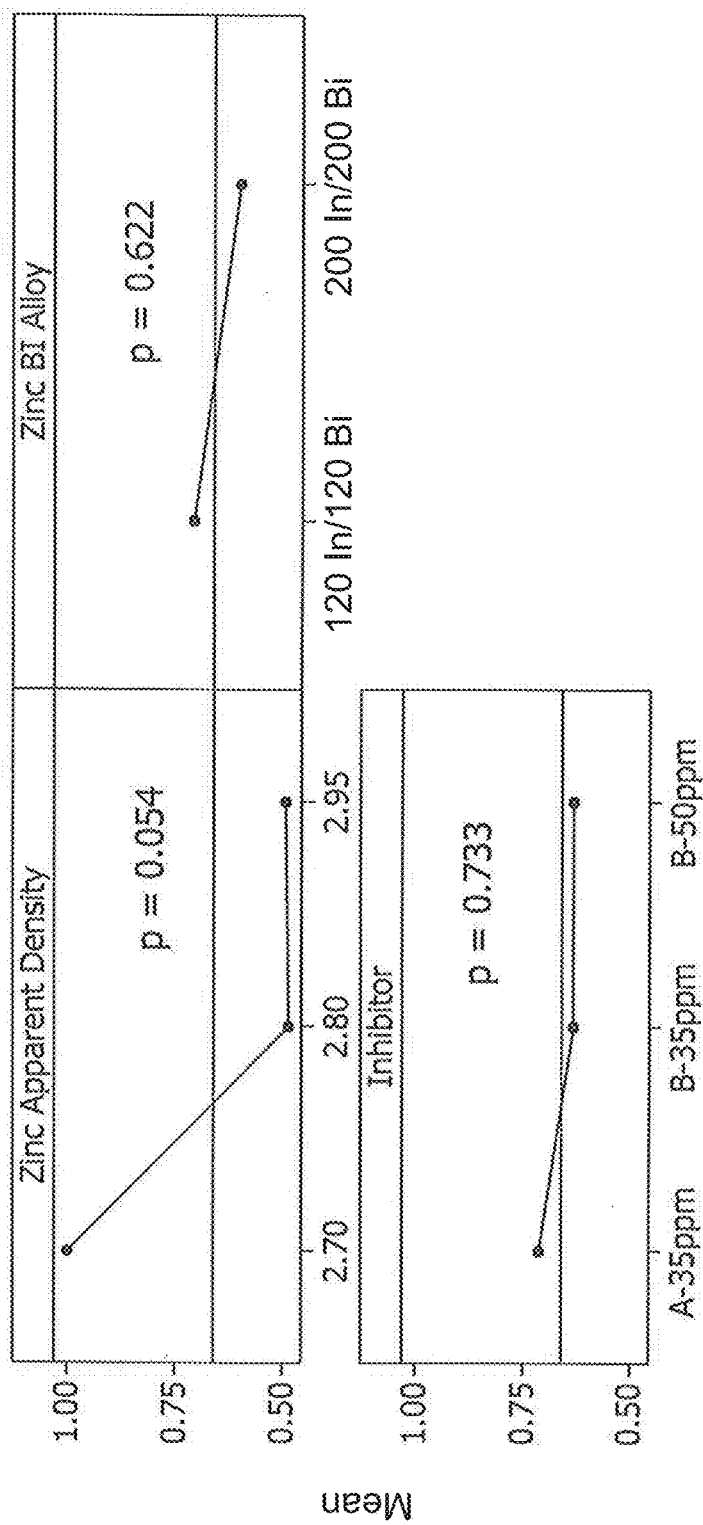
FIG. 5 shows graphical depictions of the partial discharge gassing of exemplary cells including anodes in accordance with the present disclosure.

A potentially adverse effect of lowering the anode active material apparent density is a tendency of increased partial discharge cell gassing, which can be seen in FIG. 5 (which displays the mean cell gassing in ml of volume). An appropriate gassing inhibitor and appropriate concentration amounts can be used to suppress cell gassing, however, as seen in FIG. 5 with additions of RHODAFAC® RM-510 or RHODAFAC® RS-610 inhibitors.

Example 4

DSC Performance of Cells after Storage

Two groups of cells were tested for their DSC performance after 3 months of storage. The first group of cells included a zinc alloy comprising 200 ppm of bismuth and 200 ppm of indium as the anode active material and had an apparent density of 2.94 g/cc. The second group of cells included a zinc alloy comprising 120 ppm of bismuth and 120 ppm of indium as the anode active material and had an apparent density of 3.04 g/cc. Each group of cells included about 15% of fine particles in the anode active material.

Figure 6:
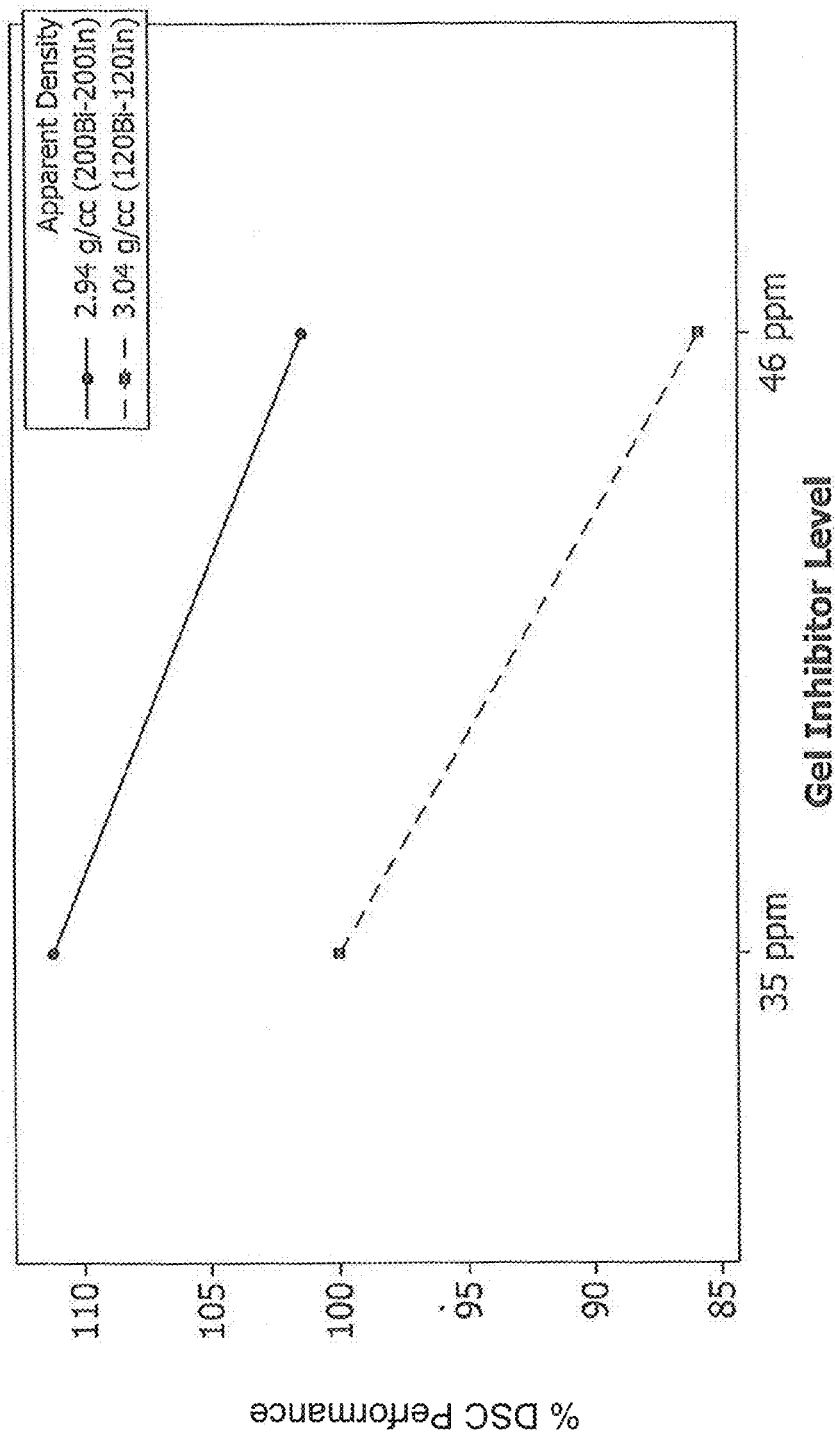
FIG. 6 is a graphical depiction of the digital still camera performance of exemplary cells including anodes having different apparent densities after three months of storage.

Both groups of cells were tested for DSC performance after 3 months of storage and with different gassing inhibitor levels (i.e., 35 ppm of a gassing inhibitor and 46 ppm of a gassing inhibitor). As can be seen in FIG. 6, at both gassing inhibitor levels the cells having the lower zinc alloy apparent density exhibited an improved performance over the cells having an apparent density over 3.00 g/cc.

When introducing elements of the present disclosure or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

In view of the above, it will be seen that the several advantages of the disclosure are achieved and other advantageous results attained. As various changes could be made in the above processes and composites without departing from the scope of the disclosure, it is intended that all matter contained in the above description and shown in the accompanying drawings shall be interpreted as illustrative and not in a limiting sense.

What is claimed is:
1. An alkaline electrochemical cell comprising:
a cathode;
a gelled anode mixture, the mixture comprising an anode active material, a gelling agent, and an alkaline electro- lyte, wherein the anode active material has an apparent density of from about 2.50 g/cc to about 3.00 g/cc and wherein the anode active material comprises particles having an aspect ratio of from about 10.0 to about 50.0; and, a separator between the cathode and the anode.

2. The cell of claim 1, wherein the anode active material has an apparent density of from about 2.65 g/cc to about 2.85 g/cc.

3. The cell of claim 1, wherein from about 5% to about 35%, by weight, of the total anode active material present in the gelled anode mixture has a particle size of less than about 75 microns.

4. The cell of claim 1, wherein the anode active material comprises a zinc alloy.

5. The cell of claim 4, wherein the zinc alloy comprises indium and bismuth.

6. The cell of claim 5, wherein the zinc alloy comprises from about 80 ppm to about 250 ppm of bismuth and from about 80 ppm to about 250 ppm of indium.

7. The cell of claim 1, wherein the gelled anode mixture further comprises a gassing inhibitor.

8. The cell of claim 7, wherein the gassing inhibitor is present in the gelled anode mixture in an amount of from about 10 ppm to about 150 ppm.

9. The cell of claim 7, wherein the gassing inhibitor is a phosphate ester.

10. The cell of claim 1, wherein the electrolyte has a hydroxide concentration of about 30% or less.

11. A gelled anode mixture, the mixture comprising an anode active material, a gelling agent, and an alkaline electrolyte, wherein the anode active material has an apparent density of from about 2.50 g/cc to about 3.00 g/cc and wherein the anode active material comprises particles having an aspect ratio of from about 10.0 to about 50.0.

12. The gelled anode mixture of claim 11, wherein the anode active material has an apparent density of from about 2.65 g/cc to about 2.85 g/cc.

13. The gelled anode mixture of claim 11, wherein from about 5% to about 35%, by weight, of the total anode active material present in the gelled anode mixture has a particle size of less than about 75 microns.

14. The gelled anode mixture of claim 11, wherein the anode active material comprises a zinc alloy.

15. The gelled anode mixture of claim 14, wherein the zinc alloy comprises indium and bismuth.

16. The gelled anode mixture of claim 15, wherein the zinc alloy comprises from about 80 ppm to about 250 ppm of bismuth and from about 80 ppm to about 250 ppm of indium.

17. The gelled anode mixture of claim 11, wherein the gelled anode mixture further comprises a gassing inhibitor.

18. The gelled anode mixture of claim 17, wherein the gassing inhibitor is present in the gelled anode mixture in an amount of from about 10 ppm to about 150 ppm.

19. The gelled anode mixture of claim 17, wherein the gassing inhibitor is a phosphate ester.

20. The gelled anode mixture of claim 11, wherein the electrolyte has a hydroxide concentration of about 30% or less.

* * * * *